(12) United States Patent
Woo et al.

(10) Patent No.: US 11,841,793 B2
(45) Date of Patent: Dec. 12, 2023

(54) SWITCH-BASED FREE MEMORY TRACKING IN DATA CENTER ENVIRONMENTS

(71) Applicant: Rambus Inc., San Jose, CA (US)

(72) Inventors: Steven C. Woo, Saratoga, CA (US);
Christopher Haywood, Cary, NC (US);
Evan Lawrence Erickson, Chapel Hill, NC (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/580,427

(22) Filed: Jan. 20, 2022

(65) Prior Publication Data
US 2022/0237113 A1 Jul. 28, 2022

Related U.S. Application Data

(60) Provisional application No. 63/142,065, filed on Jan. 27, 2021.

(51) Int. Cl.
| | | |
|---|---|---|
| *G06F 12/02* | (2006.01) | |
| *G06F 12/0871* | (2016.01) | |
| *G06F 12/0882* | (2016.01) | |
| *G06F 12/0811* | (2016.01) | |

(52) U.S. Cl.
CPC ...... *G06F 12/0238* (2013.01); *G06F 12/0811* (2013.01); *G06F 12/0871* (2013.01); *G06F 12/0882* (2013.01)

(58) Field of Classification Search
CPC .............. G06F 12/023; G06F 12/0238; G06F 12/0284; G06F 12/02811; G06F 12/0871; G06F 12/0882; G06F 2212/1024; G06F 2212/152; G06F 2212/154; G06F 2212/163
See application file for complete search history.

(56) References Cited

U.S. PATENT DOCUMENTS

| | | | |
|---|---|---|---|
| 6,366,996 B1 | 4/2002 | Hobson et al. | |
| 8,223,759 B2 | 7/2012 | Beshai | |
| 8,904,143 B2 * | 12/2014 | Coronado | G06F 3/0604 711/170 |
| 2010/0211756 A1 * | 8/2010 | Kaminski | G06F 12/023 711/E12.001 |
| 2018/0018242 A1 * | 1/2018 | Blagodurov | G06F 3/067 |
| 2019/0075186 A1 * | 3/2019 | Farhan | G06F 3/067 |

\* cited by examiner

*Primary Examiner* — Aracelis Ruiz
(74) *Attorney, Agent, or Firm* — Lowenstein Sandler LLP

(57) ABSTRACT

Computing devices, methods, and systems for switch-based free memory tracking in data center environments are disclosed. An exemplary switch integrated circuit (IC), which is used in a switched fabric or a network, can include a processing device and a tracking structure that is distributed with at least a second switch IC. The tracking structure tracks free memory units that are accessible in a first set of nodes by the second switch IC. The processing device receives a request for a number of free memory units. The processing device forwards the request to a node in the first set of nodes that has at least the number of free memory units or forwards the request to the second switch IC that has at least the number of free memory units or responds to the request with a response that indicates that the request could not be fulfilled.

19 Claims, 9 Drawing Sheets

FIG. 9

SWITCH-BASED FREE MEMORY TRACKING IN DATA CENTER ENVIRONMENTS

RELATED APPLICATION

This application claims the benefit of U.S. Provisional No. 63/142,065, filed Jan. 27, 2021, the entire contents of which are hereby incorporated by reference.

TECHNICAL FIELD

The present disclosure is generally related to computer systems and is more specifically related to switch-based free memory tracking in data center environments.

BACKGROUND

Different applications require different amounts of memory, so the amount of memory used in each server changes over time. The fixed allocation of expensive resources like memory to servers results in the possibility of memory being underutilized, as the unused memory for one server cannot be used by other servers. Underutilized memory can have a significant monetary cost to data centers, which can have thousands of servers. To improve capital and operating costs, data centers should be operating at very high memory utilization, where 100% memory utilization would be ideal. Disaggregation of data center resources is receiving increased attention as it offers the potential to improve resource utilization and Total Cost of Operation (TCO). The process of aggregating similar subsystems (e.g., central processing units (CPUs), memory, storage, accelerators) together introduces management challenges, including how the various resources are tracked and how systems request these resources. In the case of memory resources that can be provisioned to reduce underutilization of memory resources, free physical memory units such as pages need to be tracked and allocated with low latency to handle the dynamically changing nature of memory usage in the data center. In a large data center with many virtual machines, this means requests for allocation and deallocations will frequently be happening.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 9 illustrates an example packet with response data that includes free memory tracking information according to at least one embodiment.

DETAILED DESCRIPTION

Figure 1:
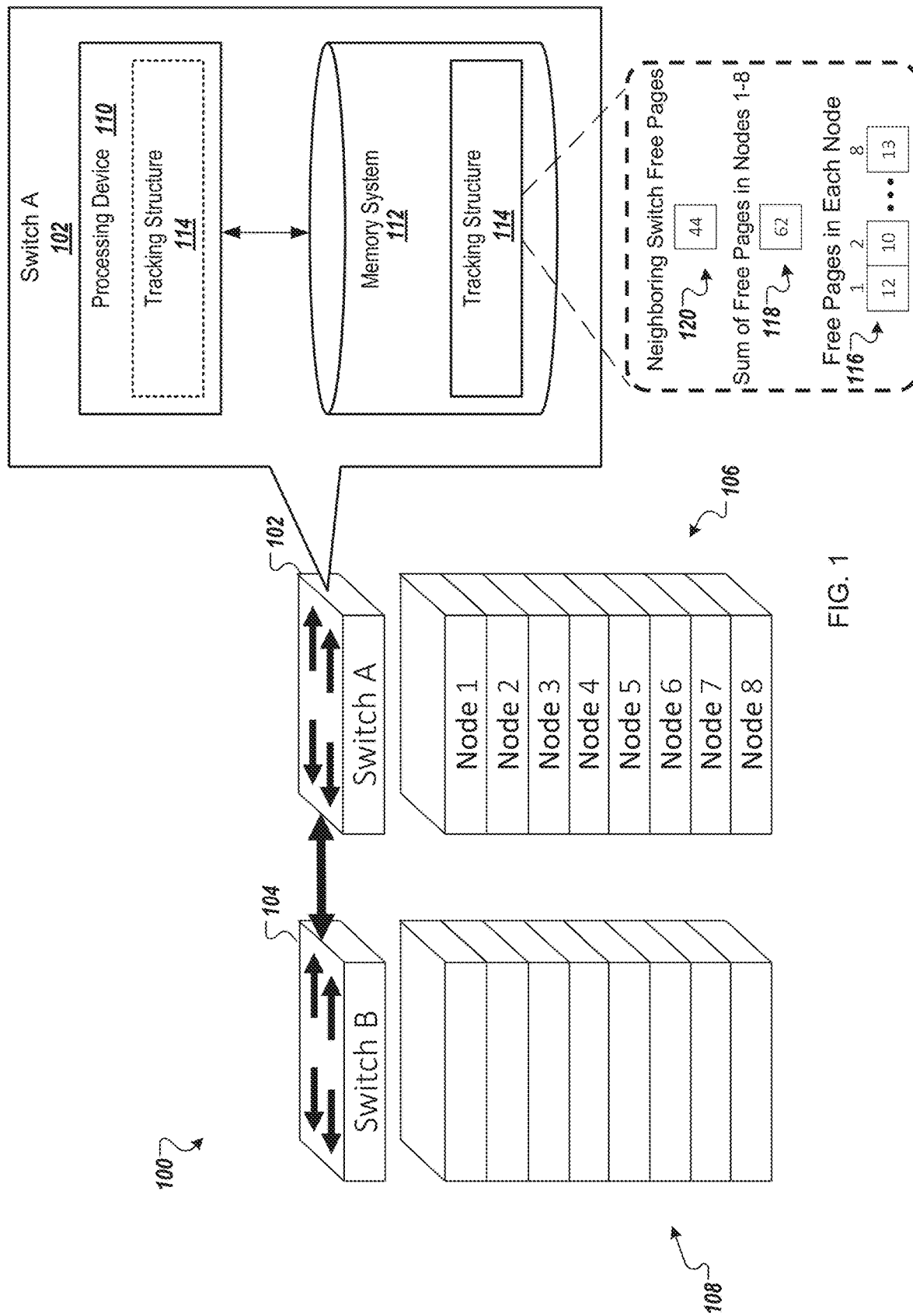
FIG. 1 is a diagram illustrating a portion of a data center in which switch-based free memory tracking is deployed according to at least one embodiment.

Embodiments described herein relate to computing platforms, methods, and systems with switch-based free memory tracking in data center environments. As described above, disaggregation of data center resources can be used to address underutilized memory in a data center but introduces management challenges, including how the various resources are tracked and how systems request these resources. For example, a disaggregated data center can aggregate similar subsystems together, including CPUs, graphical processing units (GPUs), memory, storage, accelerators, or the like. In the case of memory resources that can be provisioned to reduce underutilization of memory resources, free physical memory pages need to be tracked and allocated with low latency to handle the dynamically changing nature of memory usage in the data center. In a large data center with many virtual machines, this means requests for allocation and deallocations will frequently be happening. Proposed solutions that centralize management of disaggregated resources do not scale well with the distributed nature of the data center, and proposed solutions that de-centralize management increase the amount of work each server performs to determine from where to get the disaggregated resources.

Aspects of the present disclosure overcome the deficiencies of the proposed solutions by providing switch-based free memory tracking in data center environments. The switch-based free memory tracking can track where free memory units are located in the data center and simplify how servers send requests for free memory units when they need them. Aspects of the present disclosure do not use a central agent that tracks all free memory in the data center and handles all requests and allocations in the data center because as more nodes are added, more messages will be sent to the central agent, causing a bottleneck at the central agent. Aspects of the present disclosure do not use a server-based distributed approach in which each server tracks where free memory is and latency to access because each server has to maintain a copy of a tracking structure, causing overhead in messages being sent between servers and CPU cycles being spent updating the tracking structure and searching for memory in the data center. Aspects of the present disclosure overcome the deficiencies of the previous solutions by offloading the tracking and management to switches in the data center, providing a scalable design that fits within the distributed nature of data center architectures. Aspects of the present disclosure reduce CPU work to determine where to get memory from within the data center and use a memory-efficient tracking structure and update method to minimize communications in the data center. A switched fabric or a network in a data center connects nodes. Each of the nodes is connected to at least one switch. The switches are used to track free pages and route requests for memory. For example, when a server needs a memory page, it forwards a request to the switch it is connected to, and the switch forwards the request to a server/node with available memory using the tracking structure. Embodiments described herein can be used in various switch topologies, such as a hypercube topology (e.g., GenZ), or a Hierarchical Topology (e.g., two or more switch levels) as described herein. The embodiments described herein can be deployed in other computing systems that include two or more switches that are each operatively coupled to one or more nodes.

The systems and methods described herein may be implemented by hardware (e.g., general-purpose and/or specialized processing devices, and/or other devices and associated circuitry), software (e.g., instructions executable by a processing device), or a combination thereof. Various aspects of the methods and systems are described herein by way of examples, rather than by way of limitation.

FIG. 1 is a diagram illustrating a portion of a data center 100 in which switch-based free memory tracking is deployed according to at least one embodiment. The data center 100 includes a first switch 102, a second switch 104, a first set of nodes 106 that is operatively coupled to the first switch 102, and a second set of nodes 108 that is operatively coupled to the second switch 104. A node is any type of computing resources, such as a server with any combination of CPUs, GPUs, memory, storage, accelerators, or the like. For example, a single node can include a set of CPUs, whereas another node can include a set of GPUs. In some cases, the first set of nodes 106 are all CPU nodes, and the second set of nodes 108 are all memory resources. Alternatively, each node and each set of nodes can include different combinations of resources.

The first switch 102 implements the switch-based free memory tracking by using a tracking structure 114. Tracking structure 114 is a data structure that stores data that tracks available memory units in the first set of nodes 106. For example, the tracking structure 114 can track free memory pages and store a number or a count for each node in the first set of nodes 106. The tracking structure 114 can also calculate and store a sum of free memory pages that are collectively available in the first set of nodes 106 for sharing with neighboring switches. The tracking structure 114 can also track free memory pages of neighboring switches. In at least one embodiment, the first switch 102 can share a portion of the tracking structure 114 (e.g., the sum of free pages in the first set of nodes 106) with the second switch 104 so that the second switch 104 can track the number of free memory pages in the first set of nodes 106. Since the switches handle requests, the switches do not need to share the individual numbers for each node, just a sum. Similarly, the second switch 104 can track and share a sum of free memory pages that are available in the second set of nodes 108. In one embodiment, the first switch 102 can periodically send information from the tracking structure 114 to the second switch 104. The first switch 102 can also periodically receive information from each node in the first set of nodes 106 to update the tracking structure 114. In at least one embodiment, the memory unit is a cache line or a specified number of cache lines. In at least one embodiment, the memory unit is a memory page or a memory super page. In at least one embodiment, the memory unit is a memory block or a memory superblock. Alternatively, other units of granularity can be used for the memory unit being tracked in the tracking structure 114.

In at least one embodiment, the first switch 102 receives first information from each node of the first set of nodes 106. The first information identifies a number of memory units accessible in the respective node. The first switch 102 can update the number of memory units accessible in the respective node (e.g., 116) in the tracking structure 114. The first switch 102 can also update the sum of memory units accessible in the first set of nodes 106 (e.g., 118) in the tracking structure 114. The first switch 102 can receive second information from each neighboring switch. The second information identifies a sum of memory units accessible in the nodes under the respective neighboring switch. The first switch 102 can update the sum of memory units accessible in the nodes under the respective neighboring switch (e.g., 120) in the tracking structure 114.

In at least one embodiment, the first switch 102 includes one or more integrated circuits (ICs), including a processing device 110 and a memory system 112. The processing device 110 can be one or more CPUs, microprocessors, microcontrollers, field-programmable gate arrays, or other types of processors. The one or more processors can include one or more processor cores, graphical processor cores, accelerators, or the like. The memory system 112 can include one or more memory devices and be part of a memory subsystem, such as a dual in-line memory module (DIMM) coupled to the processing device 110. The memory system 112 can include one or more removable storage and/or one or more types of non-removable storage. The memory system 112 can include a computer-readable storage medium on which is stored one or more sets of instructions embodying any of the methodologies or functions described herein. Alternatively, the memory system 112 can be on-chip memory that is integrated with the processing device 110. The memory system 112 can include synchronous dynamic random access memory (DRAM), read-only memory (ROM), flash memory, internal or attached storage devices, or the like. The memory system 112 stores information that provides an operating system, various program modules, program data, and/or other components. In one embodiment, the memory system 112 stores the tracking structure 114 and instructions of methods to control the operation of the first switch 102, as described herein. The first switch 102 performs functions by using the processing device 110 to execute instructions provided by the memory system 112. In one embodiment, the program modules may include an algorithm that tracks free memory units in the tracking structure 114 and handles allocation requests for the free memory units as described herein. In at least one embodiment, processing device 110 is implemented in a first IC, and the memory system 112 is implemented in a second IC. In at least one embodiment, the processing device 110 and the memory system 112 are implemented in a single IC, such as a System on Chip (SoC), such as a switch IC that is used for switched fabric or a network within the data center 100. In at least one embodiment, the memory system 112 can also include available memory that can be tracked and allocated in the same manner as the available memory is tracked and allocated by the switch in the various directly connected nodes.

While the memory system 112 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media. Instructions for the program modules may reside, completely or at least partially, within the computer-readable storage medium, system memory, and/or within the processing device 110 during execution thereof. The instructions may further be transmitted or received over a network via a network interface device. The network interface device can communicate with one or more devices over wired or wireless connections. The network interface device can communicate over a private network, a public network, or any combination thereof. The first switch 102 may also include one or more input devices (keyboard, mouse device, specialized selection keys, etc.) and one or more output devices (displays, printers, audio output mechanisms, etc.). The first switch 102 can include other components, such as video display units, input devices, and signal generation devices. These components can be integrated into one or many components.

In at least one embodiment, the switch IC (also referred to as the first switch 102) includes the processing device 110 and a memory device to store the tracking structure 114 that is distributed in part with at least a second switch IC (also referred to as the second switch 104). The tracking structure 114 tracks free memory units (e.g., free memory pages) that are accessible in the first set of nodes 106 by the second switch IC and free memory units (e.g., free memory pages) that are accessible in the second set of nodes 108 by the first switch IC. The first set of nodes 106 is operatively coupled to the switch IC. In at least one embodiment, the processing device 110 receives a request for a number of free memory units. A free memory unit is considered a memory unit that is accessible and available to a requesting node. The processing device 110 determines whether any node in the first set of nodes 106 has at least the number of free memory units. The processing device 110 forwards the request to a node in the first set of nodes with at least the number of free memory units. If none of the nodes in the first set of nodes 106 has at least the number of free memory units, the processing device 110 forwards the request to the second switch IC (second switch 104) with at least the number of free memory units. In some cases, none of the nodes in the first set of nodes 106 or the second set of nodes 108 has at least the number of free memory units. In this case, the processing device 110 responds to the request with a response that indicates that the request could not be fulfilled (e.g., a negative acknowledgment (NACK). In another embodiment, if enough free memory units exist in the first set of nodes 106 (as indicated by the sum of free memory units 118, for example), the processing device 110 can split the request into multiple subrequests that total the number of units in the original request. These subrequests can be handled by switch 102, handled by multiple switches 102, 104, or the like.

As noted above, in one embodiment, the tracking structure 114 includes, for each of the first set of nodes 106, a number of memory units accessible in the respective node, a sum of memory units accessible in the first set of nodes 106 collectively. In another embodiment, the tracking structure 114 also includes a sum of memory units accessible in the second set of nodes 108 collectively, which are operatively coupled to the second switch IC. As illustrated in an example of FIG. 1, the tracking structure 114 includes a number of free pages in each node 116, a sum 118 of free pages in all nodes of the first set of nodes 106, and a number of free pages in a neighboring switch 120. In other embodiments, the tracking structure 114 can include additional tracking information that is collected or at least indicates that additional data for each memory node could be collected in addition to the number of memory units. The additional tracking information can include latency from the switch, bandwidth, congestion, electrical distance, or the like. The switch can use the additional tracking information to make an optimal determination about where to attempt to allocate memory. It should be noted that as the switches handle these requests, additional latency at the respective search can also be tracked and used to make an optimal determination about where to send the request.

Using the switch-based tracking (e.g., using the tracking structure 114), the data center 100 can use a distributed approach to tracking free memory pages (or blocks of free memory) that more closely matches the distributed nature of the data center 100. The switch-based tracking can be used in any switched fabric that connects nodes in the data center together, with each node being connected to at least one switch. As illustrated in FIG. 1, two switches share information from their tracking structure with each other to manage incoming requests. The data center 100 uses the switches to track free memory pages, and the requests for free memory are sent to the switches to determine where the requests can be serviced. The switch-based tracking can provide low latency to free memory pages. The switches have the best knowledge of the electrical distance between nodes in the data center 100. Allocation requests by nodes can first be attempted with nodes that are connected to the same switch. The switch-based tracking can minimize a number of messages to keep track of how much free memory is available in each mode. Messages can just be sent between neighboring switches instead of being broadcast across the data center 100 or sent to a central agent. The switch-based tracking can minimize storage for the tracking structures (also referred to as free page tracking structures). The tracking structures are essentially distributed among the switches, eliminating any unnecessary replication. In other embodiments, replication can be implemented as a form of redundancy. Replication can be used to cover a situation where a local node maintains a limited tracking structure of its nearest neighbors and fails to find a suitable location, the node can send a request to the switch where that tracking data is redundantly stored along with additional information about additional nodes and neighboring switches. The switch-based tracking can also leverage the existing design and functionality of a network switch processor, as described herein.

To generate and update the tracking structures, nodes and switches can report free page information to switches through explicit messages, standard packets, or as part of liveness packets, as described below with respect to FIG. 2.

Figure 2:
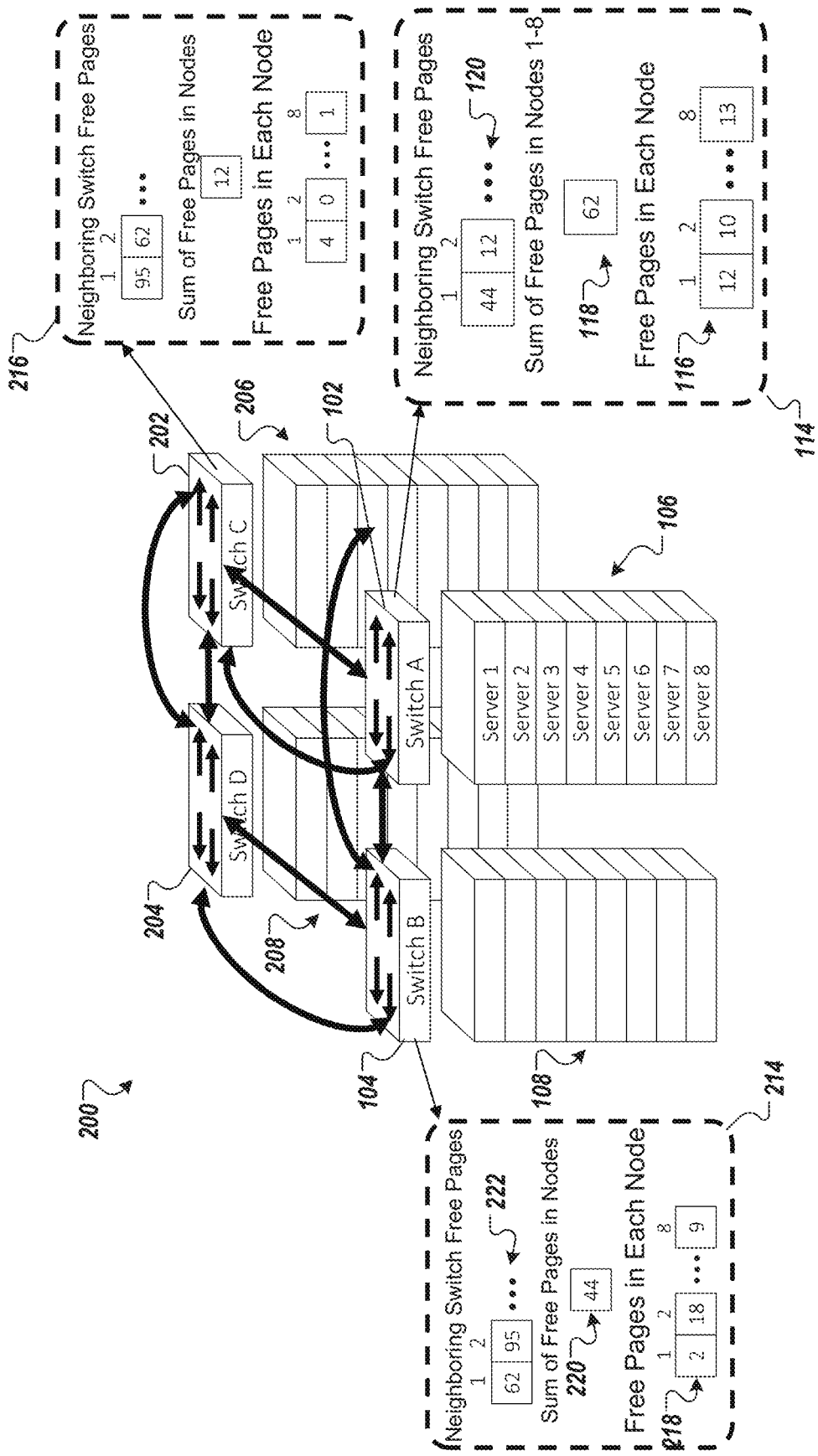
FIG. 2 is a diagram illustrating switch-based free memory tracking in a portion of a data center with a hypercube topology according to at least one embodiment.

FIG. 2 is a diagram illustrating switch-based free memory tracking in a portion of a data center 200 with a hypercube topology according to at least one embodiment. Data center 200 is similar to data center 100 as noted by similar references numbers, except the data center 200 includes a third switch 202 and a fourth switch 204, a third set of nodes 206 that is operatively coupled to the third switch 202, and a fourth set of nodes 208 that is operatively coupled to the fourth switch 204. A node is any type of computing resources, such as a server with any combination of CPUs, GPUs, memory, storage, accelerators, or the like. Each of the first switch 102, the second switch 104, the third switch 202, and the fourth switch 204 implements the switch-based free memory tracking by using tracking structures, including tracking structure 114 for the first switch 102, a second tracking structure 214 for the second switch 104, a third tracking structure 216 for the third switch 202, and a fourth tracking structure (not illustrated) for the fourth switch 204.

As illustrated in FIG. 2, tracking structure 114 is similar to the tracking structure 114 in FIG. 1, except there is a number of free pages in a neighboring switch 120 for each switch connected to the first switch 102. As such, there are a number of free pages for the second switch 104 and a number of free pages for the third switch 202 stored in the tracking structure 114. The second switch 104 includes a second tracking structure that stores data that tracks available memory units in the second set of nodes 108. For example, the tracking structure 214 can track free memory pages and store a number or a count for each node in the second set of nodes 108. The tracking structure 214 can also calculate and store a sum of free memory pages that are collectively available in the second set of nodes 108 for sharing with neighboring switches. The tracking structure 214 can also track free memory pages of neighboring switches. In at least one embodiment, the first switch 102 can share a portion of the tracking structure 114 (e.g., the sum of free pages in the first set of nodes 106) with the second switch 104 so that the second switch 104 can track the number of free memory pages in the first set of nodes 106. Similarly, the second switch 104 can track and share a sum of free memory pages that are available in the second set of nodes 108. As illustrated in an example of FIG. 2, the tracking structure 214 includes a number of free pages in each node 218, a sum 220 of free pages in all nodes of the second set of nodes 108, and a number of free pages in neighboring switches 222. Similarly, the third tracking structure 216 can store the neighboring switch free pages, a sum of free pages in the nodes connected to it, and a number of free pages in each of the individual nodes. The fourth switch 204 can also track the neighboring switch free pages, a sum of free pages in the nodes connected to it, and a number of free pages in each of the individual nodes in a tracking structure (not illustrated in FIG. 2).

In one embodiment, the first switch 102, the second switch 104, the third switch 202, and the fourth switch 204 can periodically exchange information from their respective tracking structures to maintain information on where the free memory pages are located in the data center 200 at a switch level. Each of the first switch 102, the second switch 104, the third switch 202, and the fourth switch 204 can periodically receive information from nodes connected to it to update the tracking structure. This information can be exchanged periodically, on a pull or push basis.

In at least one embodiment, the first switch 102 sends first information and second information as described above with respect to FIG. 1, except that the second information also identifies a sum of free pages in the third switch 202. In at least one embodiment, the second switch 104 receives first information from each node of the second set of nodes 108. The first information identifies a number of memory units accessible in the respective node. The second switch 104 can update the number of memory units accessible in the respective node (e.g., 216) in the tracking structure 214. The second switch 104 can also update the sum of memory units accessible in the second set of nodes 108 (e.g., 218) in the tracking structure 214. The second switch 104 can receive second information from each neighboring switch, including the first switch 102 and the fourth switch 204. The second information identifies a sum of memory units accessible in the nodes under the respective neighboring switch. The second switch 104 can update the sum of memory units accessible in the nodes under the respective neighboring switch (e.g., 220) in the tracking structure 214. The third switch and the fourth switch can send and receive similar information for their respective tracking structures in a similar manner.

In at least one embodiment, the information is received or sent using one or more messages. In at least one embodiment, the information is received or sent using one or more packets (e.g., standard packets). In at least one embodiment, the information is received or sent using one or more liveness packets. Alternatively, other heartbeat packets or heartbeat messages can be used to exchange information between the switches. In at least one embodiment, information is exchanged using a bidirectional forwarding detection (BFD) protocol. The BFD protocol provides low-overhead detection of faults between two entities connected by a link. Information from the tracking structures can be sent in packets used for the BFD protocol, such as liveliness packets. The tracking structures can be used for handling remote allocation requests for free memory pages, as illustrated in FIG. 3.

Figure 3:
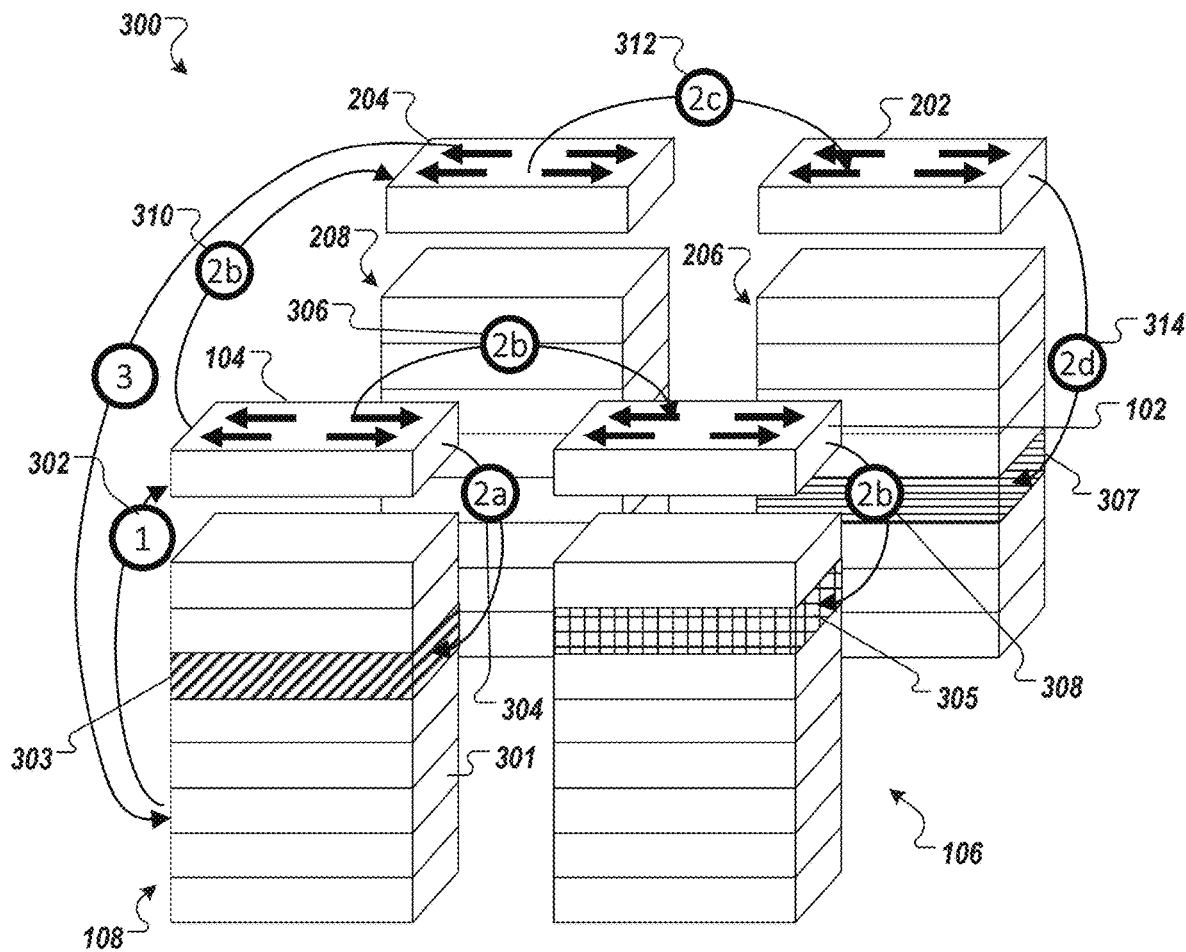
FIG. 3 illustrates an example of a remote allocation request using switch-based free memory tracking in a data center with a hypercube topology according to at least one embodiment.

FIG. 3 illustrates an example of a remote allocation request using switch-based free memory tracking in a data center 300 with a hypercube topology according to at least one embodiment. Data center 300 is similar to data center 200, as noted by similar reference numbers. In this embodiment, the second switch 104 receives a remote allocation request from a first node 301 in the second set of nodes 108 ("operation 1" 302). The first node 302 does not have to search through a local tracking structure to decide where to send the request, since the requests are handled by the switches. The second switch 104 determines, using the second tracking structure 214, whether any node in the second set of nodes 108 has a sufficient number of memory units to fulfill the remote allocation request. In at least one embodiment, the second switch 104 forwards the remote allocation request to a second node 303 in the second set of nodes 108 responsive to a determination that the second node 303 has the sufficient number of memory units to fulfill the remote allocation request ("operation 2a" 304). In at least one embodiment, the second switch 104 forwards the remote allocation request to one or more of the neighboring switches responsive to a determination that none of the nodes in the first set has the sufficient number of memory units to fulfill the remote allocation request ("operation 2b" 306, 310). In at least one embodiment, the first switch 102 determines, using the first tracking structure 114, whether any node in the first set of nodes 106 has a sufficient number of memory units to fulfill the remote allocation request. In at least one embodiment, the first switch 102 forwards the remote allocation request to a third node 305 in the first set of nodes 106 responsive to a determination that the third node 305 has the sufficient number of memory units to fulfill the remote allocation request. Similarly, the fourth switch 204 can determine, using its tracking structure, whether any node in the fourth set of nodes 208 has a sufficient number of memory units to fulfill the remote allocation request. In at least one embodiment, the fourth switch 204 can forward the remote allocation request to the third switch 202 responsive to a determination that none of the nodes in the fourth set of nodes ("operation 2c" 312) has enough memory units to fulfill the remote allocation request. The third switch 202 determines, using the third tracking structure 215, whether any node in the third set of nodes 206 has a sufficient number of memory units to fulfill the remote allocation request. In at least one embodiment, the third switch 202 forwards the remote allocation request to a fourth node 307 in the third set of nodes 206 responsive to a determination that the fourth node 307 has the sufficient number of memory units to fulfill the remote allocation request.

In at least one embodiment, the second switch 104 determines that none of the nodes in the second set of nodes 108 or the neighboring switches has a sufficient number of memory units to fulfill the remote allocation request. The second switch 104 sends a negative acknowledgment (NACK) back to the first node 301 responsive to a determination that none of the nodes in the first set and the neighboring switches has a sufficient number of memory units to fulfill the remote allocation request.

In at least one embodiment, the first node 301 is a server that makes remote allocation requests to a local switch to which it is connected. The remote allocation request can be sent to the local switch using a fabric address. As noted above, there may be no need to search through a local tracking structure to decide where to send the request. The switch decides where to forward the requests using the tracking structures. If another local node has available memory, the switch forwards the request to the other local node. If the other local nodes do not have available memory per the tracking structure, the switch forwards the request to a neighboring switch. This process can be repeated to see if any memory is available on nodes locally connected to this switch. The switch may need to forward the request to multiple switches. This can be done sequentially or concurrently. If the memory is available in a node connected to another switch, the switch forwards the request to the other switch. The allocation request fails if no memory is available or the memory is too many hops away. In this case, the NACK is sent back to the requestor. When a free page is found, the requesting and remote nodes can coordinate a page allocation. The switches simplify finding a remote free page, reduce message volume, and reduce or eliminate redundant page tracking storage. The switches do some processing and have some storage as well, freeing up the servers from spending cycles searching for free pages.

In at least one embodiment, when a forward request fails to allocate memory, instead of sending a NACK back to an originating node, the switch can retry fulfilling the request by forwarding the request to another location, such as another neighboring switch that originally attempted fulfilling the request. This process can repeat until the allocation request is successful or until one or more conditions are met, or one or more restrictions are violated, such as the process failing a specified number of times, a total time allowed for the memory request is expired, the memory request is forwarded beyond a specified number of hops from the originating node, or the like. In this case, the failure is sent back to the switch that made the request rather than directly back to the node that originates the memory request. If too many failures occur or the closest memory is too many hops away, then the switch will fail the request, and a NACK can be sent back to the originator. So, with switch-based retries, each switch could, in essence, forward the request such that it received any NACKs, and each switch would then be responsible for determining if the node originating the request should receive a NACK. For example, such as illustrated with respect to FIG. 8, when an initial allocation request can fail at a second switch, rather than a NACK going back to the originating node, the allocation request goes back to the first switch, which then forwards the request to a third switch to fulfill the request. If the third switch fails to find available memory or the request fails for other reasons, the NACK can be sent back to the originator rather than the first switch.

Figure 4:
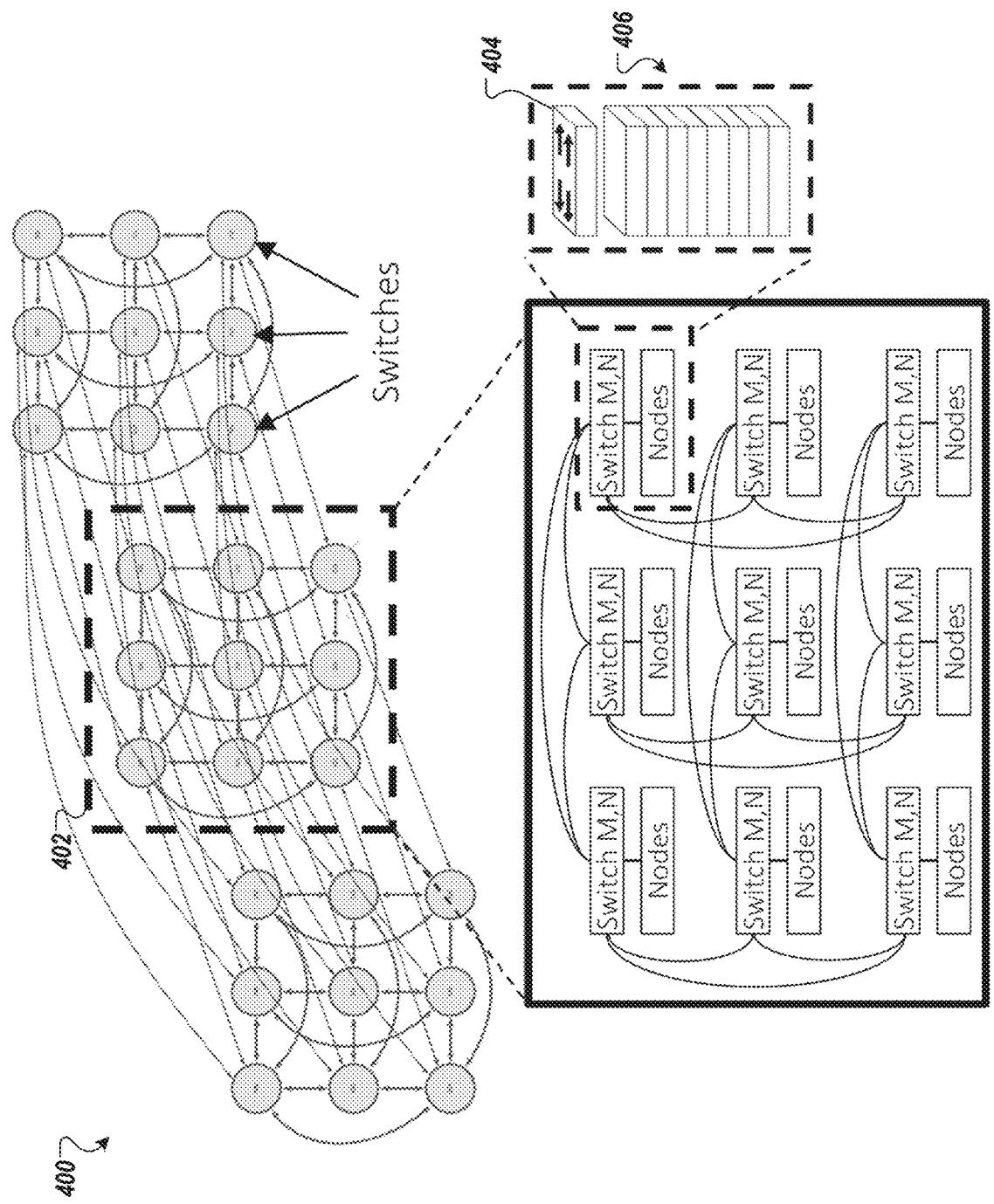
FIG. 4 is a diagram illustrating switch-based free memory tracking in a portion of a data center with a hypercube topology according to at least one embodiment.

It should be noted that FIG. 3 shows a portion of a hypercube topology, and the embodiments described herein can be deployed in each switch of the hypercube topology, such as illustrated in FIG. 4.

FIG. 4 is a diagram illustrating switch-based free memory tracking in a portion of a data center 400 with a hypercube topology according to at least one embodiment. Data center 400 includes three groups of nine switches that are fully connected in each of the N-dimensions (e.g., 3-dimensions as illustrated in FIG. 4). Each switch of the switches in a group connects to neighboring switches in the same x-direction (e.g., switches in the same row), same y-direction (e.g., switches in the same column), and same z-direction (corresponding switches in the same position in other groups). As illustrated in the expanded views of a first group of switches 402, each switch can be coupled to one or more local nodes. As illustrated, a first switch 404 is coupled to a set of nodes 406. The first switch 404 is also coupled to neighboring switches within the first group, as well as neighboring switches in other groups. Each switch in the data center 400 can share tracking information and store free memory pages (or other memory units) in a local tracking structure. The local tracking structure can be used by the switch to determine where the free memory pages are located within the data center 400.

Figure 5:
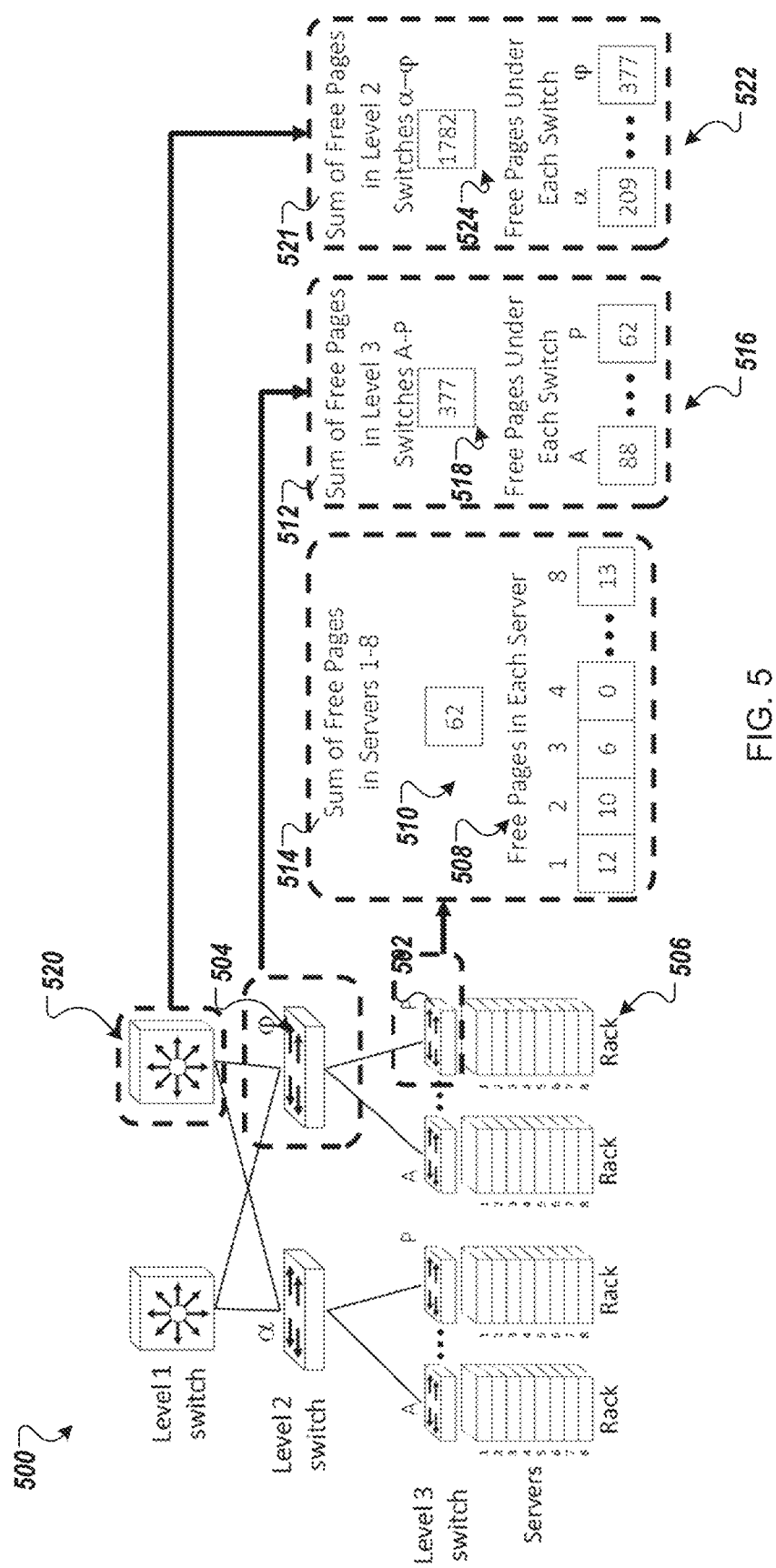
FIG. 5 is a diagram illustrating switch-based free memory tracking in a portion of a data center with a hierarchical switch topology according to at least one embodiment.

In at least one embodiment, the data center 400 includes a system fabric that is based on the Gen-Z and HyperX topology, where the HyperX topology is fully connected in each of the N-dimensions. A bridge module can be used to connect CPUs and/or GPUs to a system fabric. The bridge module can include electrical interfaces (e.g., 4×16 extended PCIe interfaces), optical interfaces (e.g., 12×4 Gen-Z interfaces), or any combination thereof. A switch module can have multiple ports (e.g., a 60-port switch module) and can have integrated optical links. Multiple fabric planes can be used for fault tolerance and to increase bandwidth. In at least one embodiment, a 3D HyperX topology can be scalable. For example, one topology can have 15 nodes×16 ($1^{st}$ dimension), ×16 ($2^{nd}$ dimension)×16 ($3^{rd}$ dimension), resulting in 61,440 nodes with 4 switch crossings. Although various embodiments described above are directed to data centers with hypercube topologies, in other embodiments, the switch-based free memory tracking can be applied to memory and other fabrics and topologies. For example, the switch-based free memory tracking can be deployed in data centers with a hierarchical switch topology, such as illustrated in FIG. 5. It should be noted that the following description of switch-based free page tracking uses an Ethernet topology to illustrate the concepts. The technique is not limited to Ethernet topologies and can be implemented in other topologies as well. Alternatively, the switches with switch-based free memory tracking can be implemented in other system architectures and topologies.

FIG. 5 is a diagram illustrating switch-based free memory tracking in a portion of a data center 500 with a hierarchical switch topology according to at least one embodiment. Data center 500 includes Level-3 switches, Level-2 switches, and Level-1 switches that are organized in a hierarchical switch topology. In another embodiment, the hierarchical switch topology can include two levels or more than three levels. In one embodiment, the Level-3 switches are top-of-rack switches that are each coupled to a set of servers. The servers can include any combination of computing resources, such as a rack of all CPUs, a rack of memory resources, a rack of storage resources, a rack of all GPUs, a rack of mixed resources, or the like. Each Level-3 switch tracks free memory pages in the servers below it, and a sum across all servers connected to it in a free page tracking structure. For example, as illustrated in FIG. 5, a first switch 502 is in a first rack and coupled to a first set of servers 506 in the rack. The first switch 502 stores a first tracking structure 514 that stores a free page count 508 for each server in the first set of servers 506 and a sum 510 across all servers connected to the first switch 502. The Level-2 switch tracks each Level-3 switch's sum of free pages and a sum across all Level 3 switches connected to it in a free page tracking structure. For example, as illustrated in FIG. 5, a second switch 504 stores a second tracking structure 512 that stores a free page count sum 516 for each Level-3 switch connected to the second switch 504 and a sum 518 across all switches connected to the second switch 504. Each Level-1 switch tracks each Level-2 switch's sum of free pages and a sum across all Level-2 switches connected to it. For example, as illustrated in FIG. 5, a third switch 520 stores a third tracking structure 521 that stores a free page count sum 522 for each Level-2 switch connected to the third switch 520 and a sum 524 across all switches connected to the third switch 520.

Using the switch-based free page tracking, the switches track the number of free memory pages in nodes that it is connected to, and the nodes send periodic messages to the switches indicating the number of free memory pages they have. The switch can maintain a table with the node number and the number of free pages.

One of the main ideas behind switch-based free page tracking is to have the switches track the number of free memory pages in nodes that it is connected to. The nodes send periodic messages to the switches indicating the number of free memory pages they have (more details on this are described below), and the switch maintains a table with the node number and the number of free pages. The size of the tracking table can be small with its size set by a maximum number of nodes that a switch can be connected to. This number is typically the number of ports that the switch has. The tracking table can be kept in on-chip memory for fast access. To minimize the size of the tracking table, the number of free memory pages can be capped at a small integer number (for example, a value of 255) to implement the value in the table as an 8-bit integer, for example. As illustrated in FIG. 5, switches can be organized in tiers. In the above example, higher-level switches maintain tables of free pages tracked in the switches they are connected to. These switches can also send periodic messages to stay in synchronization with the number of free pages available in the switches (and nodes) below them. Switches can use the tracking table for allocation requests. The following describes how a server requests a free page with switch-based free memory tracking, such as illustrated in FIG. 6.

Figure 6:
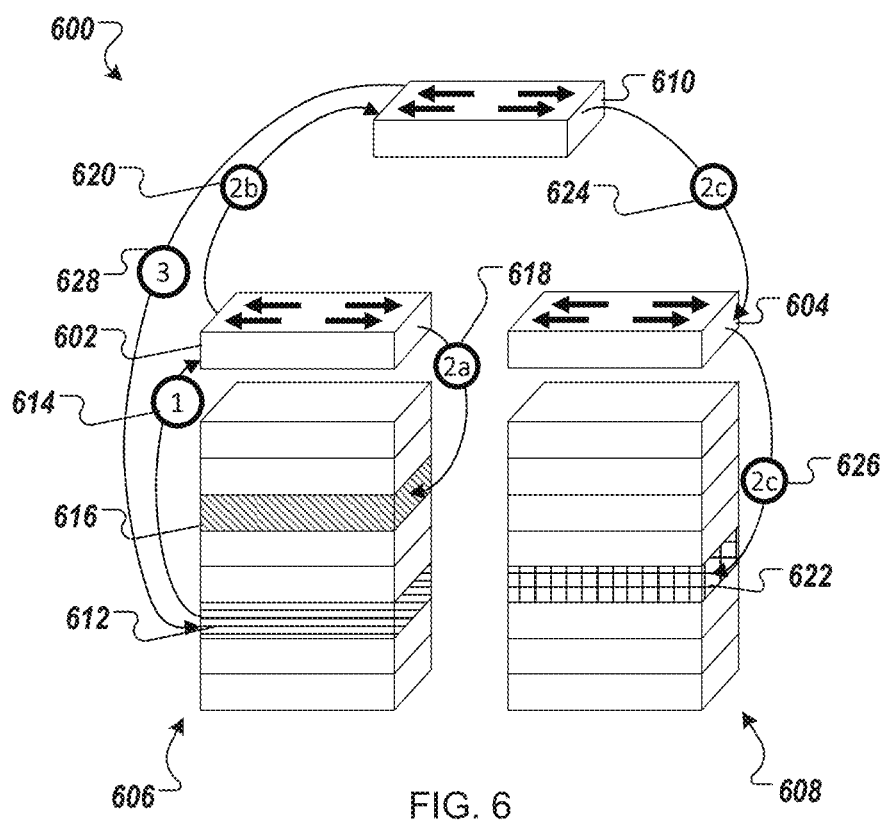
FIG. 6 illustrates an example of a remote allocation request using switch-based free memory tracking in a data center with a hierarchical switch topology according to at least one embodiment.

FIG. 6 illustrates an example of a remote allocation request using switch-based free memory tracking in a data center 600 with a hierarchical switch topology according to at least one embodiment. Data center 600 is a simplified view of a portion of the hierarchical switch topology with a first switch 602, a second switch 604, and a third switch 610. The first switch 602 is coupled to a first set of nodes 606, the second switch 604 is coupled to a second set of nodes 608, and the third switch 610 is coupled to the first switch 602 and the second switch 604. A first server 612 (e.g., a CPU at the first server) can request a free memory page. The first server 612 determines that it needs to request memory from another node. Because the first server 612 does not have any tracking tables, the first server 612 forwards this request to the first switch 602 that is directly connected to the first server 612 ("operation 1" 614). The first switch 602 decides, using a tracking structure, where to forward the request. In at least one embodiment, the first switch 602 determines that a second server 616 in the first set of nodes 606 has available memory for the request and forwards the request to the second server 616 ("operation 2a" 618). If the first switch 602 determines that none of the nodes in the first set of nodes 606 has available memory, the first switch 602 forwards the request to a next switch above—the third switch 610 ("operation 2b" 620) in this example. For example, if the first switch 602 is a Layer-3 switch, the first switch 602 forwards the request to the Layer-2 switch it is connected to. If the first switch 602 is a Layer-2 switch, the first switch 602 forwards the request to the Layer-1 switch it is connected to. The third switch 610 determines whether any node under this switch has the available memory using a tracking structure. If memory is available in another node as noted in the tracking structure, the third switch 610 forwards the request to the second switch 604 ("operation 2c" 624) and the second switch 604 forwards the request to a second server 622 ("operation 2c" 626). If the allocation request fails because there is no memory available, or memory is too many hops away, the first switch 602 sends a NACK back to the requester—the first server 612. In another embodiment, if enough free memory units exist in the first set of nodes 606 (as indicated by the sum of free memory units in the tracking table of switch 602), switch 602 can split the request into multiple subrequests that total the number of units in the original request. These subrequests can be handled by different nodes under switch 602, or through a combination of nodes under switch 602 and nodes under other switches.

In at least one embodiment, the first switch 602 queries its tracking table, and if there is free memory in another node that is connected to the same switch, the memory request is sent to that node, such as illustrated in operation 2a 618. One advantage of sending the memory request to a node connected to the same switch is that it minimizes the electrical distance, lowers access latency, and minimizes the number of messages needed to complete the allocation request. If, however, the tracking table in the first switch 602 indicates there is no free memory available in any other node connected to this same switch, then this switch forwards the request to the next switch in the hierarchy, such as illustrated in operation 2b 620. The third switch 610, then checks its tracking table, which looks for a switch one level below that has free memory. If it identifies another switch it is connected to with free memory on the level below, the third switch 610 forwards the request to this switch, the second switch 604, which forwards the request to the node with the free memory, such as illustrated in operation 2c 626. In some embodiments, when the third switch 610 receives an allocation request, it can alternatively send back a NACK (negative acknowledgment) to indicate that the allocation request failed ("operation 3" 628). It can do this if there is no memory available, or the number of hops required to get to the free memory is too large (which can negatively affect performance). If the requesting node receives a NACK, the operating system can invoke the same routines that are called when no more free memory is available. This typically involves a page fault to disk, in which a page of local memory is copied to the local disk, and the page is reused for new data.

In at least one embodiment, a switch IC resides in a Level-2 switch device, and a second switch IC resides in a Level 1 switch device. A tracking structure stored in (or accessible by) the switch IC tracks a number of free memory units that are accessible in each of a first set of nodes and a first sum of free memory units across all of the first set of nodes. The second switch IC tracks the first sum of free memory units, a second sum of free memory units accessible via a third switch that is operatively coupled to the second switch IC, and a third sum of at least the first sum and the second sum, the third sum representing free memory units across all Level-2 switch devices connected to the second switch IC.

In at least one embodiment, responsive to the switch IC being deployed in a Level-2 switch in a first hierarchical topology in which the switch IC is operatively coupled to a Level-1 switch, the tracking structure is configured to track for each of the first set of nodes, a number of memory units accessible in the respective node; and a sum of memory units accessible in the first set of nodes. Similarly, responsive to the switch IC being deployed in a Level-3 switch in a second hierarchical topology in which the switch IC is operatively coupled to a Level-2 switch, the tracking structure is configured to track for each of the first set of nodes, a number of memory units accessible in the respective node; and a sum of memory units accessible in the first set of nodes. The switch IC can receive first information from each node of the first set of nodes, the first information identifying a number of memory units accessible in the respective node, update the number of memory units accessible in the respective node in the tracking structure for each node of the first set of nodes, and update the sum of memory units accessible in the first set of nodes in the tracking structure. The switch IC can send second information to the Level-1 switch in the first hierarchical topology or the Level-2 switch in the hierarchical topology. As described herein, the first information is received using one or more messages, one or more packets, one or more liveness packets, or the like. Similarly, the second information can be sent using one or more messages, one or more packets, one or more liveness packets, or the like. The switch ICs can use a BFD protocol to send or receive information for the tracking structures.

In at least one embodiment, a switch IC resides in a Level 3 switch device, and a second switch IC resides in a Level 2 switch device that is operatively coupled to a Level 1 switch device. A tracking structure stored in (or accessible by) the switch IC tracks a number of free memory units that are accessible in each of the first set of nodes and a first sum of free memory units across all of the first set of nodes. The second switch IC tracks the first sum of free memory units, a second sum of free memory units accessible via a third switch that is operatively coupled to the second switch IC, and a third sum of at least the first sum and the second sum, the third sum representing free memory units across all Level 1 switch devices connected to the second switch IC. The Level 1 switch device is to track the third sum, a fourth sum that represents free memory units accessible via a Level 2 switch device, and a fifth sum of at least the third sum and the fourth sum, the fifth sum representing free memory units across all Level 2 switch devices connected to the Level 1 switch device.

In at least one embodiment, responsive to the switch IC being deployed in a Level-1 switch in a first hierarchical topology in which the switch IC is operatively coupled to the first set of nodes via a third switch IC in a Level-2 switch, the tracking structure is configured to track a first sum of memory units accessible in the first set of nodes; and a second sum of memory units accessible in a second set of nodes operatively coupled to the second switch IC, and a third sum of memory units accessible in the Level-2 switches in the first hierarchical topology. In at least one embodiment, responsive to the switch IC being deployed in a Level-2 switch in a second hierarchical topology in which the switch IC is operatively coupled to the first set of nodes via a third switch IC in a Level-3 switch, the tracking structure is configured to track a first sum of memory units accessible in the first set of nodes, a second sum of memory units accessible in a second set of nodes operatively coupled to the second switch IC, and a third sum of memory units accessible in the Level-2 switches in the Level-3 switches in the second hierarchical topology. As described herein, the first information is received using one or more messages, one or more packets, one or more liveness packets, or the like. Similarly, the second information can be sent using one or more messages, one or more packets, one or more liveness packets, or the like. The switch ICs can use a BFD protocol to send or receive information for the tracking structures.

In at least one embodiment, responsive to the switch IC being deployed in a Level-1 switch in a first hierarchical topology in which the switch IC is operatively coupled to the first set of nodes via a third switch IC in a Level-2 switch, the tracking structure is configured to track a first sum of memory units accessible in the first set of nodes; and a second sum of memory units accessible in a second set of nodes operatively coupled to the second switch IC, and a third sum of memory units accessible in the Level-2 switches in the first hierarchical topology.

In at least one embodiment, responsive to the switch IC being deployed in a Level-2 switch in a second hierarchical topology in which the switch IC is operatively coupled to the first set of nodes via a third switch IC in a Level-3 switch, the tracking structure is configured to track a first sum of memory units accessible in the first set of nodes; and a second sum of memory units accessible in a second set of nodes operatively coupled to the second switch IC, and a third sum of memory units accessible in the Level-2 switches in the Level-3 switches in the second hierarchical topology.

Figure 7A:
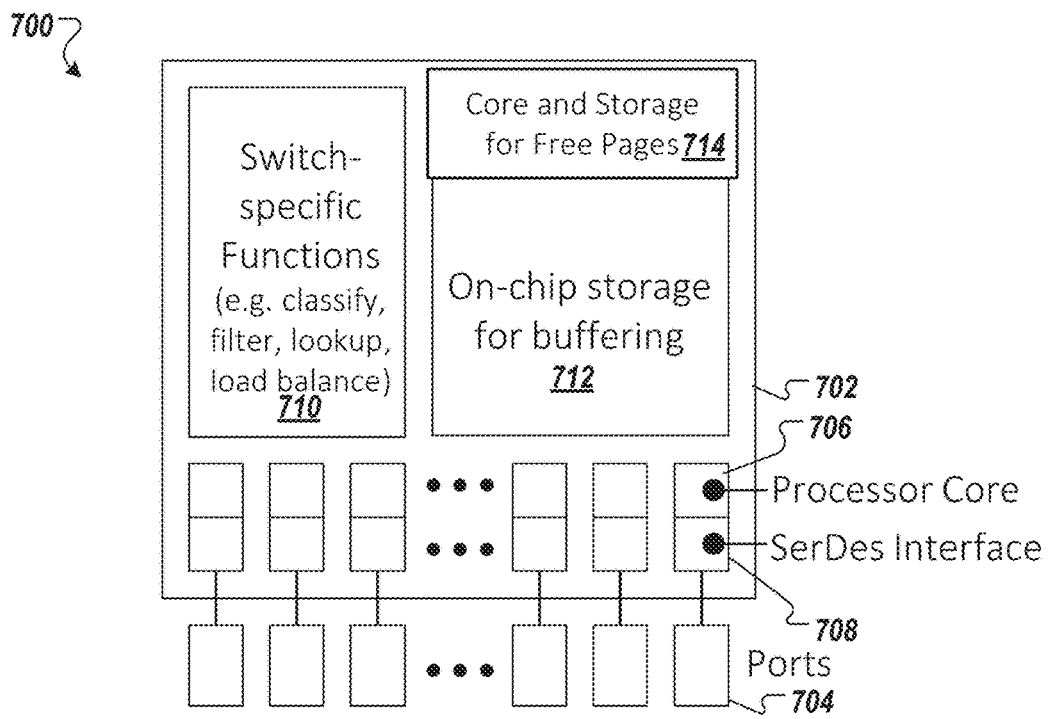
FIG. 7A is a block diagram of a switch with free memory tracking in a switch processor according to at least one embodiment.
Figure 7B:
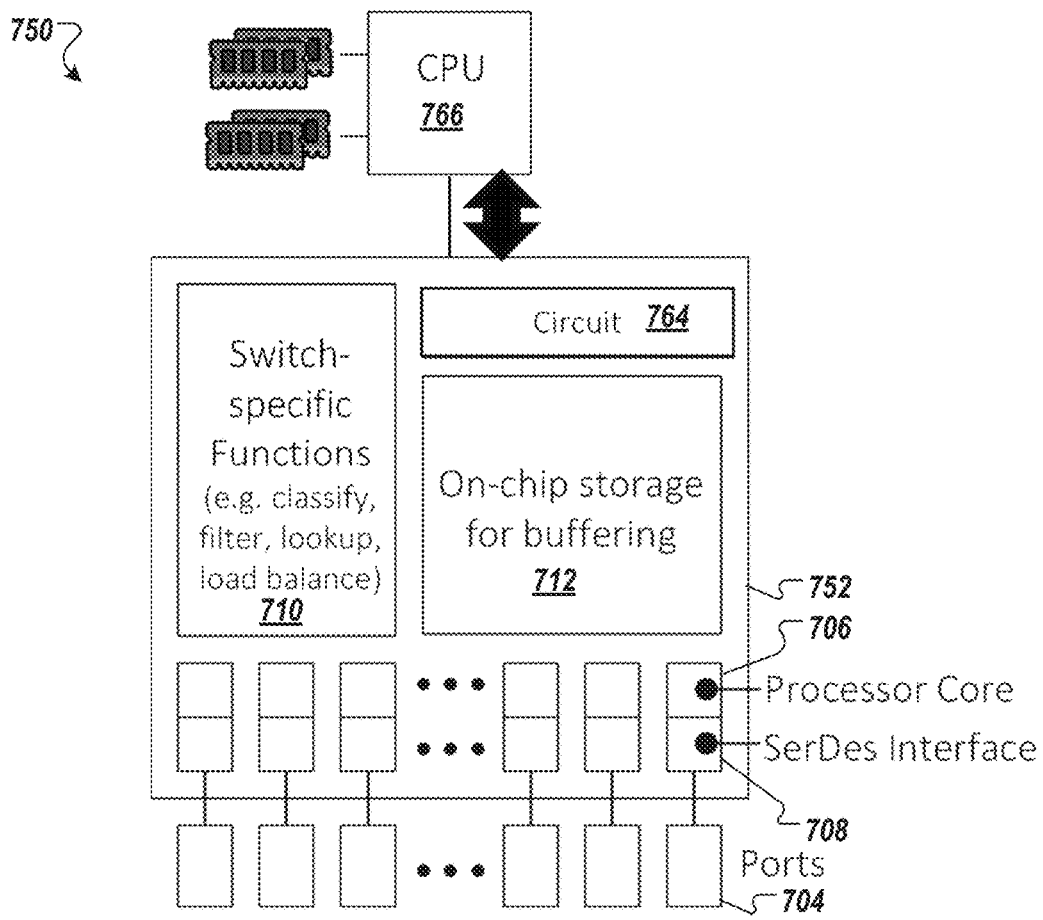
FIG. 7B is a block diagram of a switch with free memory tracking in a switch processor and a co-processor according to at least one embodiment.

The following describes the switch-based free memory tracking implemented in one or more switch processor architectures, such as illustrated in FIGS. 7A and 7B.

FIG. 7A is a block diagram of a switch 700 with free memory tracking in a switch processor 702 according to at least one embodiment. The switch 700 includes a switch processor 702 and a set of ports 704 that is configured to couple to a set of nodes and one or more neighboring switches. The switch processor 702 includes one or more processor cores 706, each including an interface (e.g., serializer/deserializer (SerDes) interface) that is coupled to one of the set of ports 704. In at least one embodiment, there is a processor core and interface for each port of the set of ports 704. In at least one embodiment, the switch processor 702 includes switch-specific functional circuits 710. The switch-specific functional circuits 710 can include circuits to perform operations like packet classification, filtering, lookup, load balancing, and the like. In at least one embodiment, the switch processor 702 includes a storage buffer 712 (e.g., on-chip storage) for buffering.

As illustrated in FIG. 7A, it at least one embodiment, the switch processor 702 includes a core 714. Core 714 can include circuitry to perform the various operations described herein for the switch-based free memory tracking. In at least one embodiment, the core 714 includes dedicated storage to store a copy of the tracking structure. In at least one embodiment, the core 714 receives information from connected nodes or other switches to update the tracking structure. In at least one embodiment, the core 714 receives a remote allocation request and determines, using the tracking structure, whether any node in a set of nodes has a sufficient number of memory units. The core 714 can forward the remote allocation request to another node in the same set, forward the remote allocation request to another switch, or send a NACK back as described herein. Alternately, the core 714 can break up the request into multiple subrequests that total the number of units in the original request. These subrequests can be handled by nodes that are all under the same switch or a combination of the nodes under the same switch and other switches. In at least one embodiment, the tracking structure is stored in a memory device. The tracking structure can store a number of memory units available in each of the individual nodes within the set of nodes and a sum of the memory units available in the set of nodes collectively.

FIG. 7B is a block diagram of a switch 750 with free memory tracking in a switch processor 752 and a co-processor according to at least one embodiment. The switch 750 is similar to the switch 700, as noted by similar reference numbers, except that instead of the core 714 with dedicated storage for switch-based free memory tracking, the switch 700 includes a circuit 764 to communicate with a co-processor 766. In at least one embodiment, the co-processor 766 includes a CPU to receive the remote allocation request via the circuit 764 and determines whether any node has a sufficient number of memory units to fulfill the remote allocation request. The co-processor 766 can forward the remote allocation request to another node or another switch via the circuit 764. Similarly, the co-processor 766 can send the NACK to the requestor when no memory is available in the node or neighboring switches. Alternately, the co-processor 766 can break up the request into multiple subrequests that total the number of units in the original request. The co-processor 766 can forward remote allocation subrequests to other nodes and/or switches via circuit 764. In at least one embodiment, the co-processor 766 can store the tracking structure in system memory (e.g., one or more dual in-line memory modules (DIMMs) or in the cache of the co-processor 766. The co-processor 766 can support DIMM modules to do local processing associated with the switch. Some switches can implement advanced in-network processing.

The switch processors 702 and 752 can implement free page tracking as described herein. In at least one embodiment, an offload processor can be used to store the tracking tables and implement the lookup function to determine where free pages are located. Also, because the size of the tracking table can be small, it is possible that a core and a small amount of on-chip memory in the switch processor can manage the information about the number of free pages available on each port. The amount of processing required to implement free page tracking and lookups can be similar to the amounts of processing that the switch processor is already able to manage without a decrease in performance.

Figure 8:
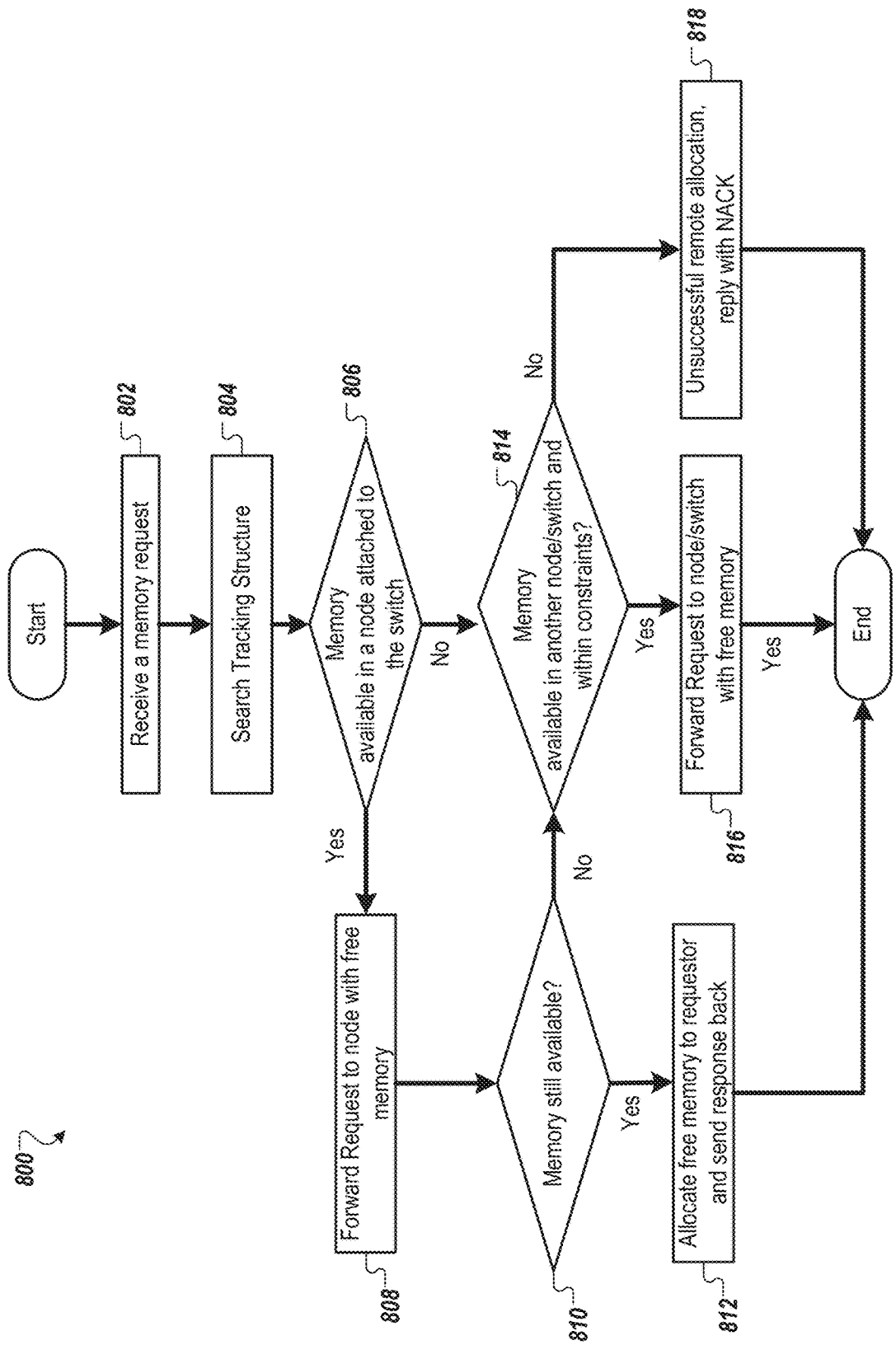
FIG. 8 is a flow diagram of a method for a remote allocation request according to at least one embodiment.

FIG. 8 is a flow diagram of a method 800 for a remote allocation request according to at least one embodiment. Method 800 may be performed by processing logic that comprises hardware (e.g., circuitry, dedicated logic, programmable logic, microcode, etc.), software, firmware, or a combination thereof. In some embodiments, method 800 may be performed by any of the switches described in connection with FIGS. 1-7.

Referring to FIG. 8, method 800 begins by the processing logic receiving a packet that identifiers a memory request (e.g., a remote allocation request for a number of memory units) (block 802). The processing logic accesses a tracking structure, including a number of memory units available in each node of a first set of nodes and a sum of memory units available in the entire first set of nodes. The processing logic can search the tracking structure (e.g., tracking table) to see if a locally connected node has free memory to fulfill the memory request (block 804). In at least one embodiment, processing logic determines, using the tracking structure, whether any node in the first set of nodes has a sufficient number of memory units to fulfill the remote allocation request (block 806). If there is memory available in a node attached to the switch at block 806, the processing logic forwards the memory request to the node with free memory (block 808). In at least one embodiment at block 808, the processing logic forwards the memory request to a first node in the first set of nodes responsive to a determination that the first node has a sufficient number of memory units to fulfill the remote allocation request. Processing logic on the node determines if the memory is still available (block 810). If the memory is still available at block 810, the processing logic on the nodes allocates the free memory to the requestor and sends a response back to the requestor (block 812), and method 800 ends. However, if memory is not available in a node attached to the switch at block 806, the processing logic determines, using the tracking structure, whether the memory is available in another node, which is coupled to a neighboring switch (block 814). In at least one embodiment, one or more constraints can be set on the memory request to neighboring switches, such as a maximum number of hops, a range of an acceptable latency between the nodes, or the like. Also, in the event where the memory request is forwarded to a node at block 808 and determined to no longer be available, the processing logic can return to block 814 to determine if the memory is available in another node/switch and within the one or more constraints. If the memory is available at a neighboring switch at block 814, the processing logic forwards the memory request to the switch (block 816), and the neighboring switch forwards the memory request to the corresponding node that has memory available; and method 800 ends. In at least one embodiment at block 816, the processing logic forwards the memory request to a second switch responsive to a determination that none of the nodes in the first set has a sufficient number of memory units to fulfill the remote allocation request. If the memory is not available at the neighboring switch at block 814, the processing logic replies to the request with a NACK, indicating that the memory request (remote allocation request) is unsuccessful (block 818), and method 800 ends. In at least one embodiment at block 818, the processing logic sends a NACK for the request responsive to a determination that none of the nodes in the first set or the second switch has a sufficient number of memory units to fulfill the remote allocation request.

In at least one embodiment, the processing on switches (also referred to as in-network processing) can implement one or more application programming interfaces (APIs) for processing and synchronization on switches. For example, switches can use the APIs for all-reduce operations, reduction operations, broadcast operations, or the like.

In at least one embodiment, status messages can be sent between switches for tracking the number of free pages available. A switch can receive periodic status updates on the number of free pages available in each node that it is connected to. In one embodiment, the periodic status updates can be included in liveness packets that already exist in some data centers. One example is the BFD protocol that allows connected entities to verify that the link between them is alive and that the entities on both ends can process these packets. BFD packets are used to minimize downtime in data centers, by allowing fast detection of broken links and entities connected to them. The period between BFD packets can vary depending on the needs of the system, and a sub-second granularity can be supported in some cases. A BFD control packet can have a variable-length payload with a BFD packet not exceeding a specified maximum length (e.g., 256 bytes in length). The actual number of bytes required to implement a liveness verification can be less than the specified maximum length, leaving additional bytes that can be used to transfer the number of free pages available in the node connected on that link or a sum of free pages in a set of nodes connected to a switch, as described herein. Periodically, a node can add additional data to the BFD packet, telling a switch processor how many pages are free, and the switch processor can update its tracking tables accordingly. The frequency of these BFD packets can be set based on the workload needs of the data center. In another embodiment, the tracking structure data can be sent as part of an optional authentication packet. In another embodiment, the tracking structure data can be exchanged using CXL packets, Gen-Z packets, or PCIe packets. In another embodiment, the same information can be sent via standard packets or standard messages between nodes and a switch or between switches. An example packet with response data is illustrated and described below with respect to FIG. 9.

Figure 9:
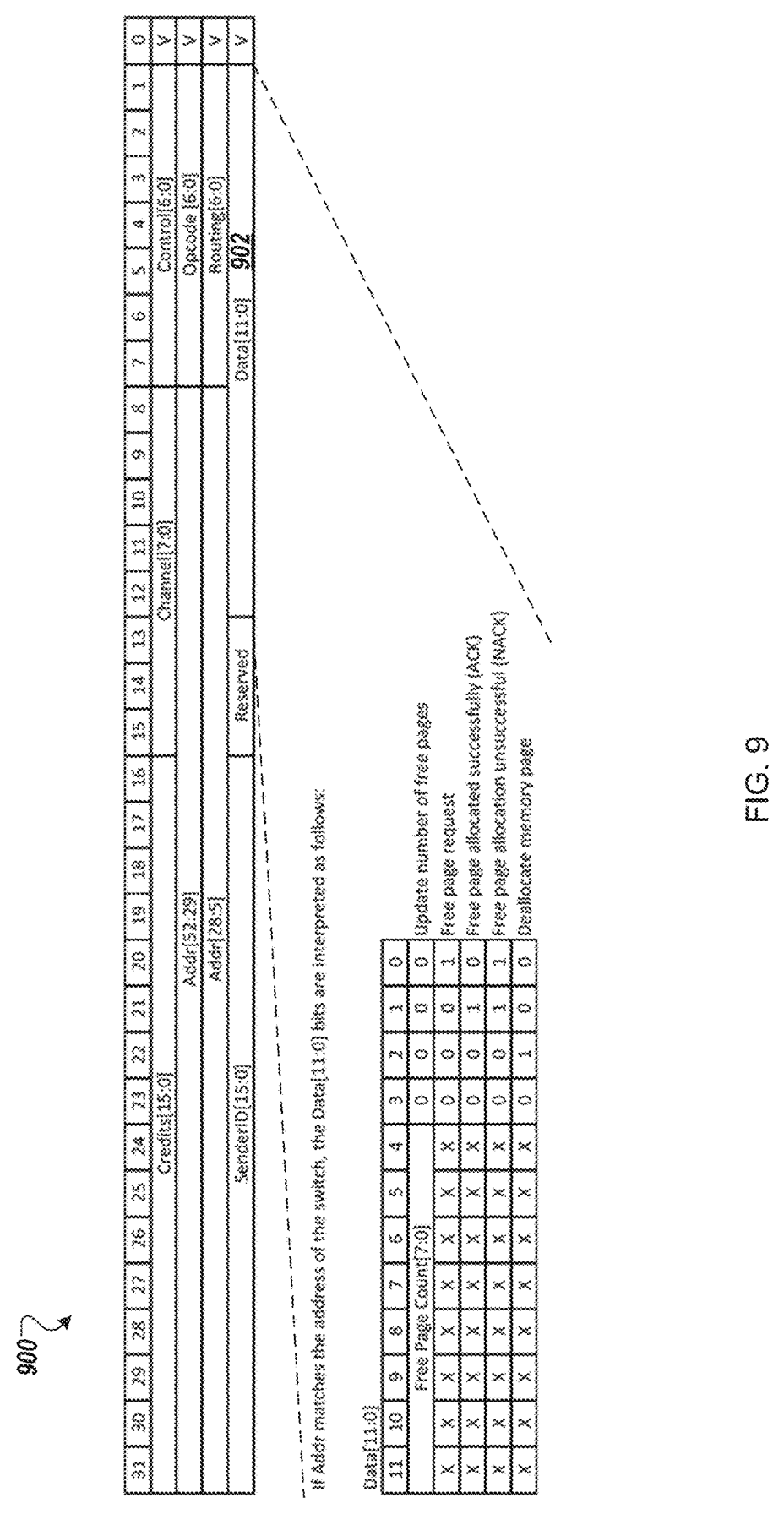

FIG. 9 illustrates an example packet 900 with response data 902 that includes free memory tracking information according to at least one embodiment. The example packet can include multiple fields across multiple bytes. One of the fields is designated for response data 902. If an address matches the address of the switch, the bits of the response data can be interpreted as one of the multiple operations, including i) updating the number of free pages including a free page count; ii) free page request; iii) free page allocated successfully (ACK); iv) free page allocation unsuccessfully (NACK); or v) deallocate memory page. Alternatively, tracking data can be included in other types of packets or as part of messages communicated between nodes and a switch or between switches.

The embodiments described herein can provide low latency to free memory pages in a data center environment, minimize a number of messages/packets used to keep track of how much free memory is available in each node, minimize storage for the free memory tracking structure, and leverage existing designs of network switch processors.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work to others skilled in the art most effectively. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, terms such as "performing," "receiving," "determining," "sending," "receiving," "computing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein, are meant as labels to distinguish among different elements and may not necessarily have an ordinal meaning according to their numerical designation.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions. The methods and illustrative examples described herein are not inherently related to any particular computer or other apparatus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description above. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A switch integrated circuit (IC) for a switched fabric or a network, the switch IC comprising:
   a memory device to store a tracking structure that is distributed with at least a second switch IC, the tracking structure to track free memory units that are accessible in a first set of nodes by the second switch IC, wherein the first set of nodes are operatively coupled to the switch IC; and a processing device operatively coupled to the memory device, wherein the processing device is to:
receive a request for a number of free memory units;
forward the request to a node in the first set of nodes that has at least the number of free memory units; or
forward the request to the second switch IC that has at least the number of free memory units; or
respond to the request with a response that indicates that the request could not be fulfilled, wherein the tracking structure comprises:
for each of the first set of nodes, a number of memory units accessible in the respective node;
a sum of memory units accessible in the first set of nodes; and
a sum of memory units accessible in a second set of nodes operatively coupled to the second switch IC.

2. The switch IC of claim 1, wherein the free memory unit is at least one of a free cache line, a free memory page, a free memory super page, a free memory block, or a free memory superblock.

3. The switch IC of claim 1, wherein, responsive to the switch IC being deployed in a hypercube topology in which the switch IC is operatively coupled to one or more neighboring switches, the tracking structure is configured to track:
for each of the first set of nodes, a number of memory units accessible in the respective node;
a sum of memory units accessible in the first set of nodes; and
for each neighboring switch of the one or more neighboring switches, a number of memory units accessible in nodes under the respective neighboring switch.

4. The switch IC of claim 1, wherein, responsive to the switch IC being deployed in a Level-2 switch in a first hierarchical topology in which the switch IC is operatively coupled to a Level-1 switch or responsive to the switch IC being deployed in a Level-3 switch in a second hierarchical topology in which the switch IC is operatively coupled to a Level-2 switch, the tracking structure is configured to track:
for each of the first set of nodes, a number of memory units accessible in the respective node; and
a sum of memory units accessible in the first set of nodes.

5. The switch IC of claim 1, wherein, responsive to the switch IC being deployed in a Level-1 switch in a first hierarchical topology in which the switch IC is operatively coupled to the first set of nodes via a third switch IC in a Level-2 switch or responsive to the switch IC being deployed in a Level-2 switch in a second hierarchical topology in which the switch IC is operatively coupled to the first set of nodes via a third switch IC in a Level-3 switch, the tracking structure is configured to track:
a first sum of memory units accessible in the first set of nodes; and
a second sum of memory units accessible in a second set of nodes operatively coupled to the second switch IC; and
a third sum of memory units accessible in the Level-2 switches in the first hierarchical topology or the Level-3 switches in the second hierarchical topology.

6. A switch comprising:
a set of ports configured to couple to a first set of nodes and a second switch; and
a memory device to store a tracking structure comprising:
i) for each of the first set of nodes, a number of memory units available in each of the first set of nodes; and ii) a sum of memory units available in the first set of nodes; and a switch processor, operatively coupled to the memory device, to:
receive a remote allocation request for a number of memory units;
determine, using the tracking structure, whether any node in the first set of nodes has a sufficient number of memory units to fulfill the remote allocation request;
forward the remote allocation request to a first node in the first set of nodes responsive to a determination that the first node has the sufficient number of memory units to fulfill the remote allocation request; or
forward the remote allocation request to the second switch responsive to a determination that none of the nodes in the first set has the sufficient number of memory units to fulfill the remote allocation request; or
send a negative acknowledgment (NACK) for the remote allocation request responsive to a determination that none of the nodes in the first set or the second switch has the sufficient number of memory units to fulfill the remote allocation request.

7. The switch of claim 6, wherein the memory unit is at least one of a cache line, a memory page, a memory super page, a memory block, or a memory superblock.

8. The switch of claim 6, wherein the switch processor is to receive the remote allocation request from a second node in the first set of nodes.

9. The switch of claim 6, wherein the switch processor is to receive the remote allocation request from a third switch.

10. The switch of claim 6, wherein the switch processor comprises:
switch-specific functional circuits;
a plurality of processor cores each coupled to one port of the set of ports via a serializer/deserializer (SerDes) interface;
a storage buffer; and
a core with dedicated storage to store a copy of the tracking structure, wherein the core is to receive the remote allocation request, determine whether any node has the sufficient number of memory units, forward the remote allocation request to the first node or the second switch, or send the NACK.

11. The switch of claim 6, further comprising a co-processor coupled to the switch processor, wherein the switch processor comprises:
switch-specific functional circuits;
a plurality of processor cores each coupled to one port of the set of ports via a serializer/deserializer (SerDes) interface; and
a circuit to communicate with the co-processor, wherein the co-processor comprises a central processing unit (CPU) to receive the remote allocation request, determine whether any node has the sufficient number of memory units, forward the remote allocation request to the first node, or the second switch or send the NACK.

12. The switch of claim 6, wherein the switch processor is to:
receive first information from each of the first set of nodes, the first information identifying the number of memory units available in each of the first set of nodes; and send second information to the second switch, the second information identifying the sum of memory units available in the first set of nodes, wherein the first information is received and the second information is sent using a bidirectional forwarding detection (BFD) protocol.

13. A computing system comprising:
a first set of nodes; and
a first switch operatively coupled to each of the first set of nodes, wherein the first switch comprises a processing device and a memory device to store a tracking structure comprising: i) for each of the first set of nodes a number of memory units available in each of the first set of nodes; and ii) a sum of memory units available in the first set of nodes, wherein the processing device is to:
receive a remote allocation request for a number of memory units;
determine, using the tracking structure, whether any node in the first set of nodes has a sufficient number of memory units to fulfill the remote allocation request;
forward the remote allocation request to a first node in the first set of nodes responsive to a determination that the first node has the sufficient number of memory units to fulfill the remote allocation request; or
forward the remote allocation request to one or more of neighboring switches responsive to a determination that none of the nodes in the first set has the sufficient number of memory units to fulfill the remote allocation request; or
send a negative acknowledgment (NACK) back to the first node responsive to a determination that none of the nodes in the first set and the one or more neighboring switches has the sufficient number of memory units to fulfill the remote allocation request.

14. The computing system of claim 13, wherein the memory unit is at least one of a cache line, a memory page, a memory super page, a memory block, or a memory superblock.

15. The computing system of claim 13, wherein the processing device is to receive the remote allocation request from a second node in the first set of nodes.

16. The computing system of claim 13, wherein the processing device is to receive the remote allocation request from a third switch.

17. The computing system of claim 13, further comprising a second set of nodes operatively coupled to a second switch, wherein the second switch is one of the one or more neighboring switches and comprises a second tracking structure comprising: iii) for each of the second set of nodes a number of memory units available in each of the second set of nodes; iv) the sum of memory units available in the first set of nodes; and v) a sum of memory units available in the second set of nodes, wherein the tracking structure further comprises: vi) the sum of memory units available in the second set of nodes.

18. The computing system of claim 17, further comprising:
a second set of nodes;
a third switch operatively coupled to the second set of nodes, wherein the third switch comprises a second tracking structure comprising: iii) for each of the second set of nodes a number of memory units available in each of the second set of nodes; and iv) a sum of memory units available in the second set of nodes, wherein the second switch comprises a third tracking structure comprising: v) the sum of memory units available in the first set of nodes; vi) the sum of memory units available in the second set of nodes; and vii) a sum of the memory units available in the first set of nodes and the second set of nodes.

19. The computing system of claim 18, further comprising a fourth switch operatively coupled to the second switch, wherein the fourth switch comprises a fourth tracking structure comprising: viii) the sum of the memory units available in the first set of nodes and the second set of nodes; ix) a sum of memory units available in nodes operatively coupled to a fifth switch that is operatively coupled to the fourth switch; and x) a sum of memory units available in the nodes operatively coupled to the fifth switch, in the first set, and the second set.

* * * * *